UNITED STATES PATENT OFFICE.

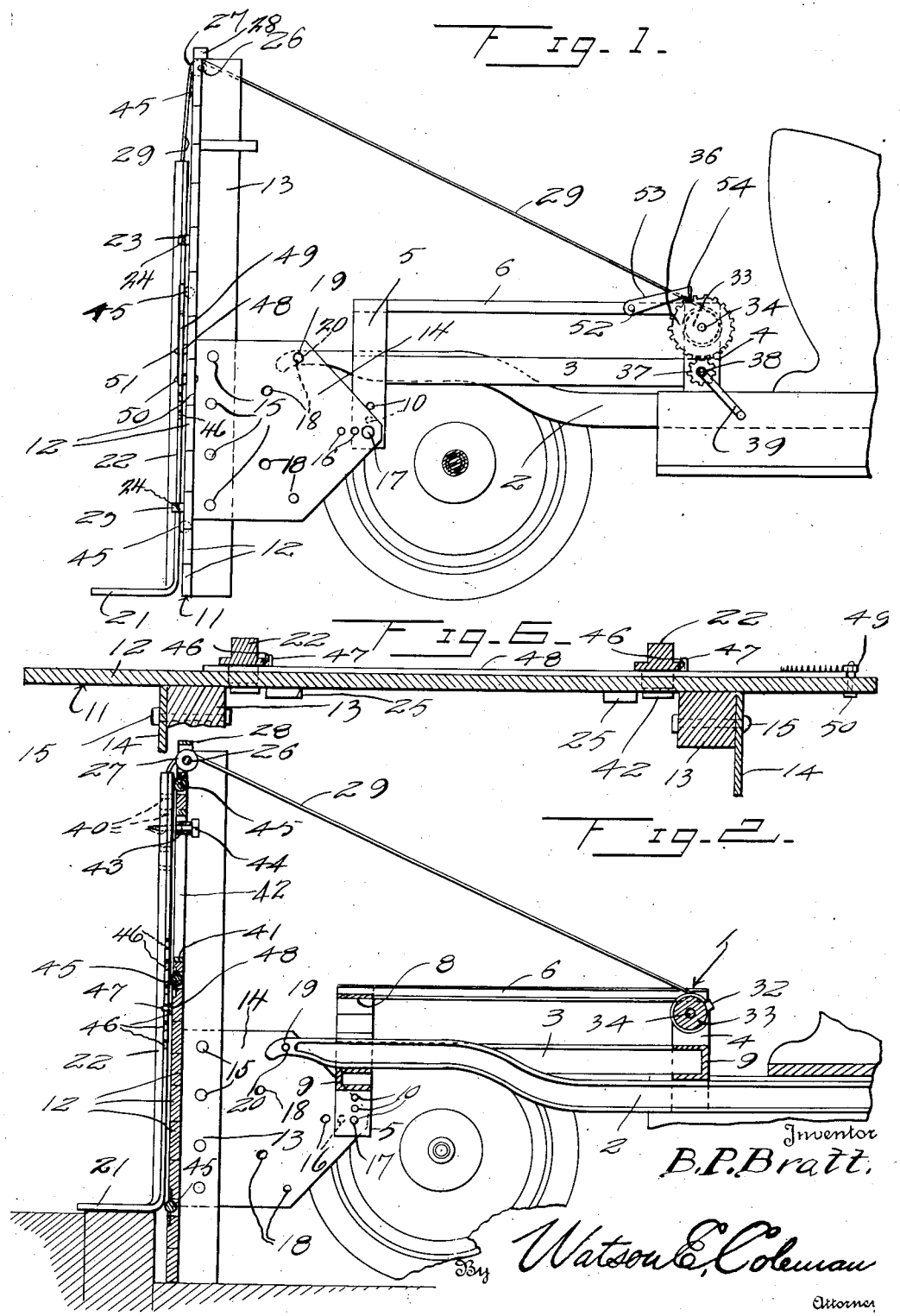

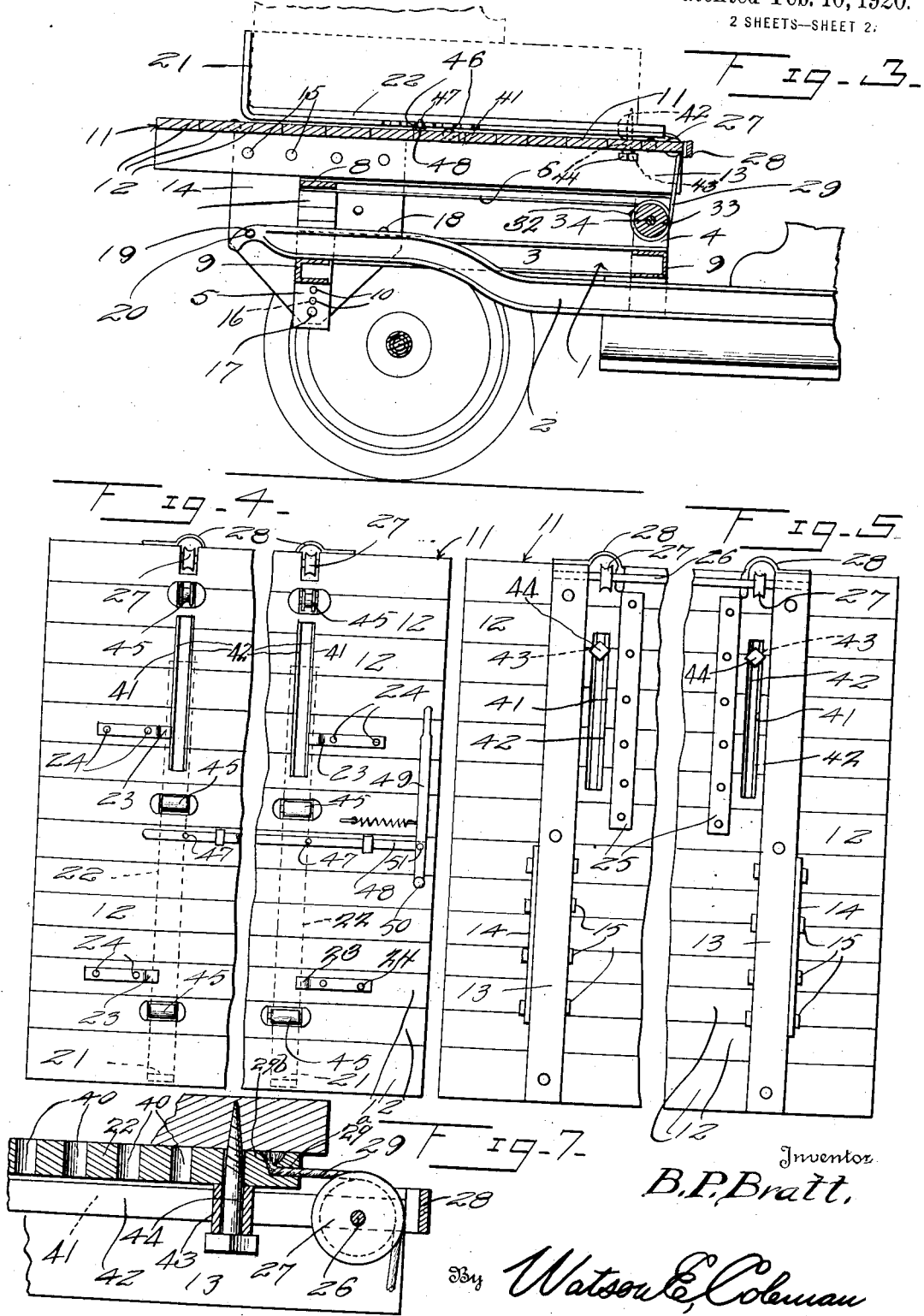

BARNEY P. BRATT, OF BAKER, OREGON.

LOADING AND UNLOADING APPARATUS.

1,330,163.

Specification of Letters Patent.  Patented Feb. 10, 1920.

Application filed September 13, 1919. Serial No. 323,543.

*To all whom it may concern:*

Be it known that I, BARNEY P. BRATT, a citizen of the United States, residing at Baker, in the county of Baker and State of Oregon, have invented certain new and useful Improvements in Loading and Unloading Apparatus, of which the following is a specification, reference being had to the accompanying drawings.
This invention relates to an improved loading and unloading apparatus, particularly of the single unit type, and more especially adapted for loading and unloading pianos and the like.
One of the objects of the invention is to provide a loading and unloading apparatus of this kind, which will eliminate the necessity of manually grasping any part of the piano, for the purpose of lifting or loading the same on the truck.

A further object of the invention is to provide a single unit loading and unloading apparatus, especially adapted for attachment to a motor driven truck, so that the truck may back up against the curb or other suitable place, and the loading and unloading platform lowered, so as to receive a piano or the like. After the platform has received the piano, it may, together with the piano thereon, be tilted and moved to a horizontal position on the truck by manually operating a crank which has connections with the loading and unloading platform.
A further object of the invention is the provision of means for holding the loading and unloading platform in different tilted positions on the truck.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of the improved loading and unloading apparatus as applied to a motor driven truck, showing the loading and unloading apparatus tilted in a vertical position in readiness to receive a piano, the piano supporting tracks of the platform of the loading and unloading apparatus being lowered.

Fig. 2 is a sectional view showing a portion of the motor driven truck, and the loading and unloading platform in a vertical position, with the piano supporting tracks raised and in engagement with the curb of the sidewalk.

Fig. 3 is a longitudinal sectional view through a motor driven truck, showing the loading and unloading platform in a horizontal position on the truck, illustrating the piano in dotted lines, and showing the load of the piano forwardly of the pivot of the loading and unloading platform.

Fig. 4 is a plan view of the loading and unloading platform.

Fig. 5 is a bottom plan view of said loading and unloading platform.

Fig. 6 is a transverse sectional view of the loading and unloading platform.
Fig. 7 is a detail sectional view through the forward portion of the platform, showing the connection of the carrier loading and unloading rails or tracks, with the cables 29, illustrating the lag screws.
Referring more especially to the drawings, 1 designates the supporting frame of the loading and unloading platform, which is mounted on the chassis or frame 2 of the motor driven truck. This frame 1 comprises the lower longitudinal side bars 3, the forward and rear vertical bars 4 and 5, which are connected to the lower longitudinal side bars 3 in any suitable manner. Extending longitudinally of the frame 1 and connecting the forward and rear vertical bars 4 and 5 are the upper side bars 6. A rear transverse bar 8 connects the rear ends of the upper longitudinal side bars 6. The lower part of the frame 1 also has lower forward and rear transverse bars 9. The forward and rear transverse bars 9, and the lower longitudinal side bars 3 are in the form of channel irons, while the upper bars 6 are in the form of angle irons, thereby insuring a rigid structure. The lower portions of the rear vertical bars 5 are provided with a plurality of openings 10 vertically spaced.

The loading and unloading platform comprises the platform proper 11 which comprises a plurality of transverse boards 12, which are secured together and braced by the longitudinal beams 13. Broad side plates 14 are secured by means of bolts 15 to the beams 13. These broad side plates 14 extend downwardly, and have a plurality of openings or apertures 16. Suitable pivot bolts 17 extend through certain of the registering apertures 10 and 16, thereby pivotally mounting the broad side plates and pivotally supporting the loading and unloading platform. The bolts 17 may be adjusted in the various apertures 10 and 16 so as to mount the loading and unloading platform according to the proportions of the chassis of the truck at the back of the vehicle seat. The broad depending side plates 14 are provided with a plurality of apertures or openings 18, which are arranged on an arcuate curve substantially concentric with the pivot pins 17. The rear ends of the side bars of the chassis or frame of the truck are provided with openings or apertures 19, with which the apertures 18 are designed to register, that is when the loading or unloading platform is in a vertical or horizontal position. When the loading and unloading platform is in a horizontal or vertical position, or in angular positions between the horizontal and vertical positions, the registering apertures 18 and 19 receive a transverse pin 20, which extends transversely of the chassis or frame of the truck, thereby holding the loading and unloading platform in various positions, namely those above specified. When the loading and unloading platform is in a vertical position, a piano may be moved adjacent its face, which at that time is facing rearwardly, so that the arms 21 of the loading and unloading tracks 22, which are carried by the platform, may extend under the piano.

The loading and unloading tracks are substantially T-shaped in cross-section, as shown in the drawings, and are mounted in guides 23. These guides are secured to the upper face of the platform by means of bolts 24. The under faces of the boards of the platform have secured thereto cleats 25, which assist in holding the boards of the platform rigid.

Journaled in bearings of the forward ends of the beams 13 of the platform is a transverse shaft 26, on which pulleys 27 are fixed. Guard plates 28 are secured to the ends of the beams 13, and overlie the pulleys, so as to retain the cables 29 in engagement with the pulleys. These cables are connected to the forward ends of the loading and unloading rails or tracks, by inserting the ends of the cables into or through the holes 29$^a$ formed in the ends of the carrier rails or tracks 22. Larger holes 29$^b$ are bored or formed from the top faces of the carrier rails, and into which the wires of the cables are spread. Molten Babbitt metal is then poured into the larger holes adhering to the walls of the holes and the wires of the cables, thereby insuring a secure and neat connection or coupling between the cables and the carrier rails or tracks. These cables 29 pass over the pulleys 27. The cables 29 are in turn wound about and attach as at 32 to a drum 33, the pintles 34 of which are journaled in bearings of the forward vertical bars 4. One end of the drum 33 carries a spur gear 36, which meshes with the gear 37 on a shaft 38, which is also mounted in bearings of the vertical bars 3 of the frame 1. The transverse shaft 38 has a crank 39, which when operated imparts motion to the shaft 38 and the drum 33, which will cause the cables 29 to wind upon the drum, thereby not only raising the loading and unloading tracks of the platform, but also tilting the platform to a horizontal position on the frame 1 of the truck. The beams 13 of the platform assume positions on the outside of the upper longitudinal side bars 6 of the frame 1, when the platform is in a horizontal position.

The loading and unloading tracks or rails for carrying the piano are provided with a plurality of openings or apertures 40. These apertures or openings 40 are arranged to accommodate pianos of various sizes. The platform near its forward portion is provided with longitudinally extending slots 41, having their walls provided with metal strips 42 acting as wear plates. Lag screws 44 are designed to engage through the lined slots 41, and also through certain of the openings or apertures 40 of the loading or unloading carrier rails or tracks of the platform, and have threads, so as to be threaded into the rear face of a piano, in order to firmly fasten the piano to the carrier rails 22. The heads of the lag screws 44 are rectangular preferably, though not necessarily, and these screws protrude far enough through the lined slot 41 so as to permit of easy access to the heads of the screws whereby they may be tightened. Bushing collars or sleeves are mounted upon the lag screws between the rectangular heads and the carrier rails or tracks, and protrude into the lined slots. The bushings or sleeves 43, which are carried by the lag screws, extend through the slots 41 and act as antifrictional members. In other words, these bushings or sleeves prevent frictional binding as the tracks or rails are moved on the platform.

When the tracks or rails are adjusted with relation to the platform, the slide bar 48 may be moved so that its tongues 47 may engage certain of the grooves or notches 46, which are formed upon the edges of the rails or tracks, thereby acting to hold the rails or tracks in their adjusted positions.

When the tongues 47 are disengaged from the notches or grooves of the rails, the rails or tracks may be adjusted by operating the cables 29. By means of a suitable wrench applied to the rectangular heads of the lag screws, said screws may be adjusted or may be removed so that they may be extended through other of the openings or apertures 40. The lag screws may be adjusted in different positions through any of the apertures or openings 40, to accommodate pianos of various sizes and heights. Furthermore, the lag screws act to guide the rails and allow the carrier rails or tracks to be lowered to various positions, according to the distance between the frame 1 and the pavement or ground, and act to relieve the strain upon the guides or clamps 23. For instance, the carrier rails or tracks may be adjusted so that their arms may assume positions considerably below the surface on which the wheels of the truck are supported. If desired, the carrier rails or tracks, for loading and unloading pianos may be adjusted, so that their arms 21 may assume positions in engagement with the curb of the sidewalk, whereby a piano may be rolled or pushed, with its back adjacent the loading and unloading platform, with the arms 21 directly under the piano.

When the piano is so disposed, and the loading and unloading platform is in a vertical position, motion may be imparted to the drum by operating the crank, which will tilt the platform to a horizontal position. After the loading and unloading platform assumes a horizontal position, further movement of the crank is necessary in which case the drum will be rotated, and the carrier rails or tracks will be moved forwardly, hence positioning the load of the piano forwardly of the pivots of the loading and unloading platform. When unloading the piano or other article, the pin 20 is first removed, then the piano is moved rearwardly on the loading and unloading platform, until the weight or load of the piano will overbalance the platform. By applying back pressure upon the crank, the platform may be allowed to slowly tilt to a vertical position, and subsequently allow the rails or tracks to lower, in which case the piano will be in a vertical position, either upon the ground or upon the sidewalk. In either case, however, the salesman may demonstrate the various advantages of the piano, while in this position, in order to convince the purchaser of the instrument before the same is carried into the house.

The rear portions of the carrier rails or tracks ride upon supporting pulleys 45, which are journaled in suitable bearings of the platform.

The loading and unloading carrier rails or tracks are provided with grooves 46 on their edges, to receive the tongues 47, which are carried by a bar 48. A lever 49 is pivoted at 50 and has a pivotal connection as at 51 with the bar 48, so that by oscillating the lever 49, the tongues 47 may be withdrawn from the notches or grooves of the rails or tracks, so that the rails or tracks may be adjusted in different positions.

Pivotally mounted at 52 on the side of the auxiliary frame is a dog 53, the nose 54 of which is designed to engage the teeth of the spur gear, so as to hold the drum in different adjusted positions, whereby the platform may be held in different angular positions, so that the supporting pin at the rear may be inserted.

The invention having been set forth, what is claimed as new and useful is:

1. In a loading and unloading apparatus for pianos and the like, the combination with a truck frame, of an auxiliary frame mounted upon the truck frame, a platform pivotally fulcrumed on the auxiliary frame, and adapted to assume horizontal or vertical positions relatively to the auxiliary frame, said platform having longitudinally movable carrier rails or tracks having right angle extending arms, adapted to engage under the piano when the platform is in a vertical position, and means carried by the auxiliary frame and having connections with the tracks or rails, for raising the same, and tilting the platform to a horizontal position on the auxiliary frame.

2. In a loading and unloading apparatus for pianos and the like, the combination with a truck frame, of an auxiliary frame thereon, a loading and unloading platform adjustable pivotally on the auxiliary frame, said platform having longitudinally movable carrier rails, said carrier rails having arms adapted to engage under a piano, when the rails are lowered, while the platform is in a vertical position, and a windlass mechanism having cable connections with the rails for raising the rails vertically on the platform while in a vertical position, whereby the platform may be subsequently tilted to a horizontal position on the auxiliary frame.

3. In a loading and unloading apparatus for pianos and the like, the combination with a truck frame, of an auxiliary frame thereon, a loading and unloading platform adjustable pivotally on the auxiliary frame, said platform having longitudinally movable carrier rails, said carrier rails having arms adapted to engage under a piano, when the rails are lowered, while the platform is in a vertical position, and a windlass mechanism having cable connections with the rails for raising the rails vertically on the platform while in a vertical position, whereby the platform may be subsequently tilted by the platform may be subsequently tilted to a horizontal position on the auxiliary frame, and means for holding the platform in different pivotal positions on the auxiliary frame.

4. In a loading and unloading apparatus for pianos and the like, the combination with a truck frame, of an auxiliary frame thereon, a loading and unloading platform pivotally fulcrumed on the auxiliary frame and adapted to assume either a vertical or horizontal position, said platform having longitudinally movable carrier rails, having means at their rear ends adapted to engage under the piano when the platform is in a vertical position, means connected to the rails for raising them and tilting the platform to a horizontal position, and means for holding the carrier rails in different adjusted positions relatively to the platform.

5. In a loading and unloading apparatus for pianos and the like, the combination with a truck frame, of an auxiliary frame thereon, a loading and unloading platform pivotally fulcrumed on the auxiliary frame and adapted to assume either a vertical or horizontal position, said platform having longitudinally movable carrier rails, having means at their rear ends adapted to engage under the piano when the platform is in a vertical position, means connected to the rails for raising them and tilting the platform to a horizontal position, and means for holding the carrier rails in different adjusted positions relatively to the platform, and means for holding the platform in different angular positions intermediate the horizontal and vertical positions relatively to the auxiliary frame.

6. The combination with a truck frame, of an auxiliary frame thereon, a platform pivotally mounted upon the auxiliary frame and adapted to assume vertical or horizontal positions and angular positions relatively to the auxiliary frame, means including cables for tilting the platform from a vertical position to a horizontal position on the auxiliary frame, said platform having guides, loading and unloading carrier rails mounted in said guides of the platform and having their rear ends provided with right angle extending arms, adapted to engage under the piano, the carrier rails being connected to the cables, whereby upon operating said cables, the rails may be raised and the platform subsequently tilted to a horizontal position.

7. The combination with a truck frame, of an auxiliary frame thereon, a platform pivotally mounted upon the auxiliary frame and adapted to assume vertical or horizontal positions and angular positions relatively to the auxiliary frame, means including cables for tilting the platform from a vertical position to a horizontal position on the auxiliary frame, said platform having guides, loading and unloading carrier rails mounted in said guides of the platform and having their rear ends provided with right angle extending arms, adapted to engage under the piano, the carrier rails being connected to the cables, whereby upon operating said cables, the rails may be raised and the platform subsequently tilted to a horizontal position, and means for holding the carrier rails in different positions relatively to the platform, so as to accommodate pianos of different sizes.

In testimony whereof I hereunto affix my signature.

BARNEY P. BRATT.